March 18, 1952 H. RIVIERE 2,589,732
JET-PROPELLED AIRCRAFT
Filed July 20, 1949

INVENTOR
HENRI RIVIERE
BY
Robert B. Larson
ATTORNEY

Patented Mar. 18, 1952

2,589,732

UNITED STATES PATENT OFFICE 2,589,732

JET-PROPELLED AIRCRAFT

Henri Rivière, Paris, France, assignor to "Office National d'Etudes et de Recherches Aeronautiques" (O. N. E. R. A.), Paris, France, a society of France Application July 20, 1949, Serial No. 105,780 In France July 22, 1948

6 Claims. (Cl. 244—15)

The present invention relates to jet propelled aircraft, that is to say to aircraft propelled by one or several jets of a gaseous mixture resulting from combustion of a fuel in a preliminarily compressed air stream.

Its chief object is to provide an aircraft of this kind which is better adapted to meet the requirements of practice than those used at this time.

According to my invention, in an aircraft of the kind in question including at least one turbo-compressor unit (i. e. a compressor supplying air under pressure to one or several combustion chambers which feed hot gases to a turbine serving to drive said compressor), I provide means for sending a portion of the air delivered by this compressor toward one or the other of two series of combustion chambers provided with jet propulsion nozzles, one of these series of chambers giving rearwardly directed jets and forming a propulsion unit whereas the other series of chambers gives frontwardly directed jets and constitutes a braking unit which permits, when brought into play, of reducing the landing run of the aircraft.

Figure 1:
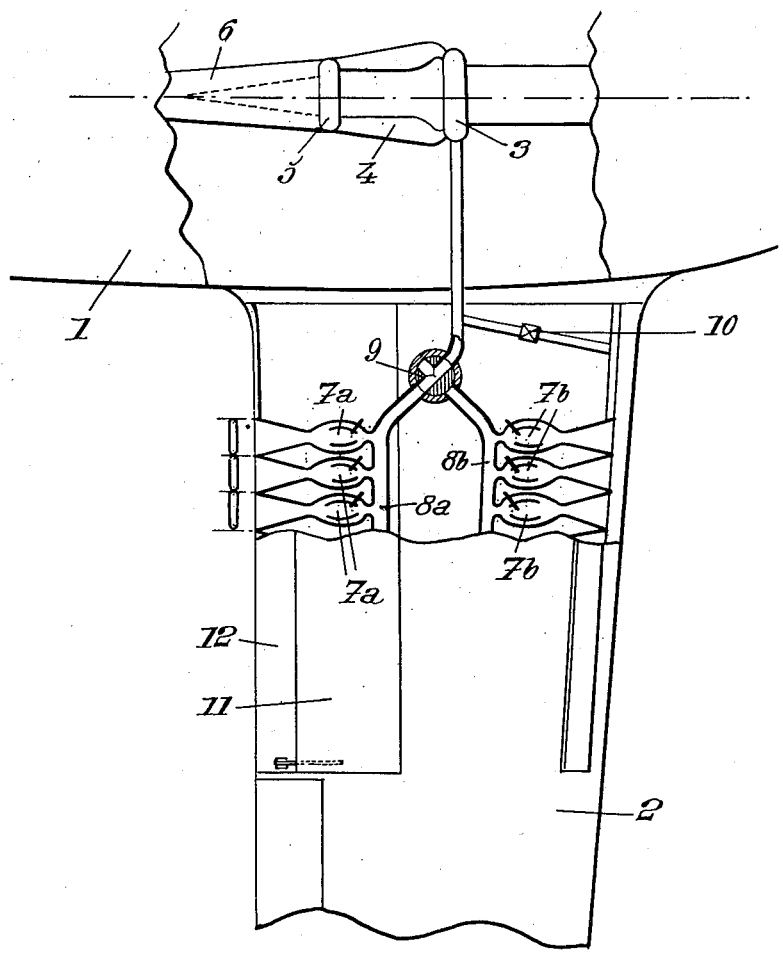
Figure 2:
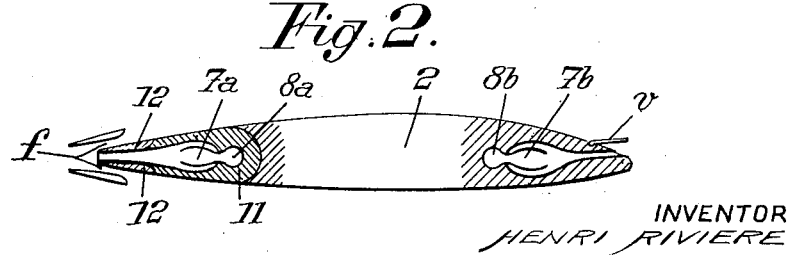

A preferred embodiment of the present invention will be hereinafter described with reference to the accompanying drawings, given merely by way of example and in which:

Figs. 1 and 2 diagrammatically show, respectively in plan view with portions cut away and in enlarged cross section on the line II—II of Fig. 1, a jet propulsion airplane made according to my invention.

The airplane shown by the drawing includes a central fuselage 1 and a monoplane wing 2.

I provide, preferably in the central fuselage 1, a turbo-compressor which includes, among other elements, a compressor 3 to supply air under pressure to combustion chamber 4 which itself supplies a gas turbine 5 serving to drive said compressor, the energy present in the gases issuing from said turbine being advantageously used for propelling purposes, in the form of jet reaction, in a nozzle 6.

According to the main feature of my invention, a portion of the air delivered by compressor 3 is adapted to be supplied to one or the other of two combustion chambers (or series of combustion chambers) 7a and 7b which feed jet nozzles, one of these series of chambers, 7a, giving rearwardly directed jets and forming a propelling unit, whereas the other series of chambers, 7b, gives frontwardly directed reaction jets and constitutes a kind of braking unit.

Each combustion chamber may supply either one or several nozzles of the corresponding unit, possibly all of the nozzles of this unit.

It will be of interest to give the outlet section of the nozzles a shape which is flattened in the direction of the wing span.

Preferably, the propelling unit 7a is located close to the trailing edge of wing 2 and the braking unit 7b close to the leading edge of said wing, the nozzles of this last mentioned unit opening advantageously, for instance in an oblique direction, into the upper face of the leading edge, and the outlet of said nozzles being adapted to be covered by a shutter v capable of restoring, for normal flying, continuity of the leading edge.

It suffices, in these conditions, to provide, between compressor 3 and the two mains 8a and 8b opening respectively into chambers 7a and 7b, valve means, such for instance as a three-way cock 9, to permit of bringing into play either the propelling unit or the braking unit, according as it is desired either to accelerate the flight of the airplane or, on the contrary, to reduce its speed for landing.

It should be noted that three-way cock 9 may be controlled either independently, at the pilot's will, or in connection with the controls of other devices which are to be operated when landing.

Furthermore, it will be advantageous to provide a discharge device, such for instance as a safety valve 10, for preventing dangerous overpressures from building up on the upstream side of three-way cock 9.

Anyway, it will be preferable to supply combustion chambers 4 and turbine 5 with just the amount of air necessary to ensure the drive of the turbo-compressor unit. In other words, I arrange turbine 5 (for instance through a suitable choice of the number of its stages) in such manner as to exhaust to the maximum degree the reactive energy of the gaseous stream flowing therethrough, the jet issuing from said turbine then producing only a relatively low thrust.

Thus, most of the propelling action, under normal running conditions, will be supplied by propelling unit 7a, the action of which is stopped just when it is desired to brake the run of the airplane by bringing braking unit 7b into play. The braking energy will then be represented substantially by the difference between the reactive energy supplied toward the front by unit 7b (which energy is of the same order of magnitude as the propelling energy of unit 7a) and the residual energy, substantially lower and rearwardly directed, resulting from the operation of the turbo-compressor group.

In such an airplane, the propelling system is of the turbo-reactor type, the compression portion of said system being housed in fuselage 1 whereas the reactive portion proper is mostly located in wing 2, which reactive portion may besides include, for each unit, as already indicated, either a plurality of nozzles, or a single nozzle, of flat section, braced in the direction of the wing depth.

It should be noted that means, such for instance as telecontrolled valves, may be provided for cutting off at will the feed of only a portion of combustion chambers 7a, which permits of reducing the propelling thrust without altering in any way the aerodynamic qualities of the wing. In this case, same as when the propelling unit is wholly stopped while bringing the braking unit into service, it will always be possible quickly to restore the propelling power to its maximum value because the turbo-compressor group preserves in all circumstances its normal working.

On the other hand, the presence of compressed air tanks in the wing will permit of supplying slots provided in said wing for blowing the boundary layer.

Although the propelling unit 7a may be made stationary (and then preferably with pivotable deflectors making it possible to direct the jet), it seems preferable to fit it, as shown by the drawing, in a kind of pivotable aileron 11 the operation of which permits of directing the jet in an upward or downward direction according as it is desired to obtain a lift increase or reduction effect.

Finally, it will be of interest, in order to improve the efficiency of the jets issuing from the propelling unit 7a, to provide, along this unit, deflectors, preferably of a retractable type, capable of acting, through an injector effect, to suck in the boundary layer and to drive a certain amount of surrounding air into the wing trailing edge zone, such deflectors being for instance constituted by a system of upper and lower shutters adapted to be brought from a retracted position in the thickness of the trailing edge to an active position, at the rear of the preceding one, for which a suction slot f appears between the front edge of each of said shutters and the wing body.

Several turbo-compressor groups could be provided for supplying the propelling and braking units.

I might also use, for supplying said units, one or several compressed air generators of a type different from that above described, for instance of the free piston type.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An aircraft which comprises, in combination, at least one wing and one fuselage, at least one rearwardly directed jet nozzle in the trailing edge of said wing, at least one frontwardly directed jet nozzle in the leading edge of said wing, two fuel combustion chambers in said wing opening each into one of said nozzles, compressor means in said fuselage for supplying air under pressure and means interposed between said compressor means and said chambers for supplying air from said compressor means to one or the other of said combustion chambers.

2. An aircraft which comprises, in combination, at least one wing and one fuselage, at least one rearwardly directed jet nozzle in the trailing edge of said wing, at least one frontwardly directed jet nozzle in the leading edge of said wing, two fuel combustion chambers in said wing opening each into one of said nozzles, respectively, an air compressor carried by said aircraft, a turbine on said aircraft mounted to drive said compressor, a combustion chamber interposed between the outlet of said compressor and the inlet of said turbine, and means interposed between said compressor and said two first mentioned chambers for supplying a portion of the air delivered by said compressor to one or the other of said two first mentioned combustion chambers.

3. An aircraft which comprises, in combination, at least one wing and one fuselage, at least one rearwardly directed jet nozzle in the trailing edge of said wing, at least one frontwardly directed jet nozzle in the leading edge of said wing, two fuel combustion chambers in said wing opening each into one of said nozzles, respectively, an air compressor in said fuselage, a turbine in said fuselage mounted to drive said compressor, a combustion chamber interposed between the outlet of said compressor and the inlet of said turbine, and means interposed between said compressor and said two first mentioned chambers for supplying a portion of the air delivered by said compressor to one or the other of said two first mentioned combustion chambers.

4. An aircraft according to claim 1 further including a shutter pivoted to said leading edge to close said second mentioned jet nozzle when this nozzle is not in operation.

5. An aircraft which comprises, in combination, at least one wing and one fuselage, a flap pivoted to the trailing edge of said wing, at least one rearwardly directed jet nozzle in said flap, at least one frontwardly directed jet nozzle in the leading edge of said wing, two fuel combustion chambers in said wing opening each into one of said nozzles, respectively, an air compressor carried by said aircraft, a turbine on said aircraft mounted to drive said compressor, a combustion chamber interposed between the outlet of said compressor and the inlet of said turbine, and means interposed between said compressor and said two first mentioned chambers for supplying a portion of the air delivered by said compressor to one or the other of said two first mentioned combustion chambers.

6. An aircraft which comprises, in combination, at least one wing and one fuselage, a flap pivoted to the trailing edge of said wing, at least one rearwardly directed jet nozzle in said flap, at least one frontwardly directed jet nozzle in the leading edge of said wing, two fuel combustion chambers in said wing opening each into one of said nozzles, respectively, an air compressor in said fuselage, a turbine in said fuselage mounted to drive said compressor, a combustion chamber interposed between the outlet of said compressor and the inlet of said turbine, and means interposed between said compressor and said two first mentioned chambers for supplying a portion of the air delivered by said compressor to one or the other of said two first mentioned combustion chambers.

HENRI RIVIÈRE.

REFERENCES CITED

The following references are of record in the file of this patent:

UNITED STATES PATENTS

| Number | Name | Date |
|---|---|---|
| 2,081,151 | Myers | May 25, 1937 |
| 2,409,177 | Allen et al. | Oct. 15, 1946 |
| 2,422,744 | O'Neil | June 24, 1947 |
| 2,451,008 | Williams | Oct. 12, 1948 |
| 2,453,721 | Mercier | Nov. 16, 1948 |
| 2,501,078 | Newcomb | Mar. 21, 1950 |

FOREIGN PATENTS

| Number | Country | Date |
|---|---|---|
| 523,468 | Great Britain | July 15, 1940 |